Feb. 22, 1944. E. D. PHILLIPS 2,342,217
LUBRICATING DEVICE FOR CLOSED BORES OR HOLES
Filed June 14, 1943
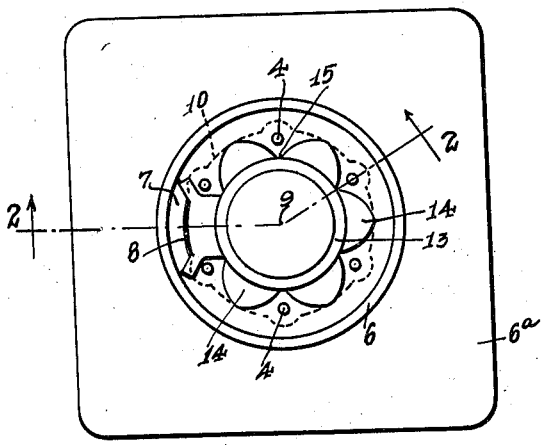
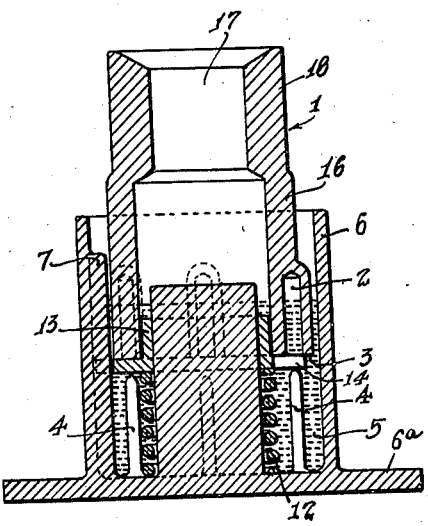
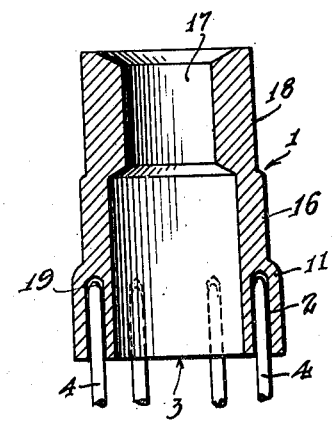
Inventor
ERNEST D. PHILLIPS
By Lyon & Lyon
Attorneys Patented Feb. 22, 1944

2,342,217

UNITED STATES PATENT OFFICE 2,342,217

LUBRICATING DEVICE FOR CLOSED BORES OR HOLES

Ernest D. Phillips, Los Angeles, Calif.

Application June 14, 1943, Serial No. 490,737

7 Claims. (Cl. 91—46)

This invention relates to a device to facilitate lubricating an opening such as a drilled hole or bore for any purpose, for example, in a situation where the bore or hole is to be tapped, or to have any other machine work done upon its interior, that would be facilitated by having its surface wet or lubricated.

While the invention is applicable in a situation where it is desired to wet the surface of a tube or bore, it is especially useful when applied to lubricate a bore or a hole formed in a machine part from below, the bore or hole being closed above.

An object of the invention is to provide simple means for insuring that an immersion of the article or machine part in the liquid, will result in bringing the liquid into contact with the wall of the bore or hole.

In practice, it is sometimes necessary to perform a machine operation such as tapping, that is to say, cutting a thread in a number of small drilled holes in an article such as a small machine part. An object of the present invention is to provide simple means for facilitating the lubricating of small holes such as referred to in a machine part under circumstances referred to above.

As applied to a device for facilitating the lubrication of a plurality of bored or drilled holes in a machine part or other article, one of the objects of the invention is to provide simple means for insuring the alignment of oilers such as pins with their respective holes, when using the device to apply the lubricant to the interior of the holes.

Further objects of the invention will appear hereinafter.

The invention consists in the novel parts and combination of parts to be described hereinafter, all of which contribute to produce an efficient lubricating device for closed bores or holes.

A preferred embodiment of the invention is described in the following specification, while the broad scope of the invention is pointed out in the appended claims.

In the drawing:

Fig. 1 is a plan of a device embodying this invention, capable of being used to wet or lubricate a plurality of drilled openings extending up in an article from below when the same is applied to this device.

Fig. 2 is an ideal vertical section taken on the line 2—2 of Fig. 1, and illustrating the article such as a machine part in place in my device, and ready to be immersed into liquid such as a lubricating oil that is carried in the liquid-holder or cup of the device.

Fig. 3 is a bottom plan of the article such as the machine part illustrated in Fig. 2.

Fig. 4 is a vertical section taken on the line 4—4 of Fig. 3, passing through the machine part that is to be lubricated, and showing it in the same position in which it is illustrated in Fig. 2. This view illustrates the relation of the lubricating spurs which pass into the holes when the article or machine part is pushed down into the cup and immersed in the liquid.

Referring to Figs. 1 and 2, it should be said that these views illustrate the invention as applied to a small article such as a machine part 1, which is provided with a plurality of small drilled holes 2 that extend into the same from an end face 3 of the article. In the present instance, I have illustrated the construction involving the use of six of these openings 2 which necessitate the use of an equal number of lubricators or spurs 4 which align with these openings or holes 2, and which will pass into the openings when the article 1 is immersed in the liquid 5 that is confined in the body or holder 6 of the device which is of cup form, and provided with a bottom 6a from which the spurs 4 extend upwardly.

In order to insure that when the machine part 1 is immersed in the liquid 5, it will be in a properly oriented position on its vertical axis. To align the pins or spurs 4 with the openings 2, I prefer to provide the inner face of the wall of the cup with guiding means in the form of a vertically extending rib 7. This rib 7 has a concave inner face 8 which is an arc struck from the axis or center 9 on a radius, and this radius is slightly greater than the radius of the perimeter or periphery 10 of the article 1, which in the present instance, is of substantially cylindrical form at this point, but provided with longitudinally extending bosses or ribs 11 at which the drilled holes 2 are located (see Fig. 3).

A construction such as that described above, can be used for wetting the interior of the holes 2 with a liquid by simply inserting the article 1 in the cup in its proper oriented position, and then shoving it down into the liquid. When this is done, of course the atmospheric air that will be caught in the holes 2, would prevent the liquid from rising to a substantial extent within these holes, but by reason of the presence of the spurs or pins 4, it will be evident that as immersion takes place, the spurs pass relatively up into the holes 2 and will expel a considerable part of the air that is trapped in these holes. Then when the article 1 is quickly withdrawn, a partial vacuum is created by the withdrawal of the spurs 4 from the interior of the holes, and this will cause the liquid to rise to a considerable height in the holes 2.

Although a cup with pins in its bottom can be used as described for accomplishing the purposes of this invention, I prefer to provide means for assisting in the quick withdrawal movement of the part 1 after it has been deeply immersed in the liquid 5. For this purpose I prefer to provide resilient means mounted in the cup in such a way that this resilient means such as a coil spring 12, will develop a force urging the part 1 upwardly after it has been deeply immersed. As this spring eliminates a considerable part of the work in raising the part, and assists the movement at a time when the assistance is needed, because it is evident that only very slight effort is necessary to push the article down into the cup, and this movement need not be suddenly accomplished; while on the other hand, the upward movement must be quickly accomplished, and the spring materially helps in this. Although in some situations I may simply place the coil spring in a position at the bottom of the cup where it will contact directly with the lower end of the article that is being immersed, I prefer to provide the interior of the cup with a rest 13 which is in the form of a collar with a plurality of outwardly projecting leaves or ears 14, the upper faces of which provide a rest for the face 3 of the part 1 when it is about to be immersed, and these leaves 14 are spaced apart so as to leave the clearance angles 15 between the same, at which the pins or spurs 4 are located.

The part 1 that is illustrated, may have a substantially cylindrical body 16 in the end face 3 of which the holes 2 are formed, and the other end of the article may have a bore 17 of reduced diameter, which is formed inside of a hexagon-shaped upper end 18.

In order to facilitate the entrance of the spurs 4 into the holes, the upper ends 19 of the spurs are preferably tapered to a blunt point. These spurs 4 have a diameter of course slightly less than the diameter of the holes 2 into which they move when the article 1 is depressed, although they should not fit tight. Of course when they withdraw from the holes in the upward movement of the part 1, the space that they occupy develops a partial vacuum, and as the lower end face 3 of the part 1 is still located below the level of the liquid, the atmospheric pressure on the surface of the liquid will force it up in the holes, thereby wetting their inner surfaces.

Guiding means such as the guide rib 7 is particularly useful, because it makes it unnecessary for the operator of the device to use any particular care in regard to the matter of orientation of the part when it is inserted into the cup. It is merely necessary to apply the lower end of the part 1 so that the curved portion of its perimeter 10 is located adjacent to this rib.

Although I have illustrated my invention as performing the service of lubricating holes or bores, the inner ends of which are closed, it will be obvious that the invention is also useful for lubricating the inner faces of holes that are open at the upper end; for example, holes drilled in flanges. In such a case, however, there is no particular difficulty in getting the liquid to pass through the hole.

Many other embodiments of the invention may be resorted to without departing from the spirit of the invention.

What I claim is:

1. In a device for wetting the surface of a bore that is closed above and extends up into an article from below; the combination of a holder for the liquid, having a spur projecting upwardly and adapted to pass into the said bore and displace a portion of the atmospheric air within the same when the said article is immersed in the liquid, said spur operating to create a partial vacuum in the bore when the said article is quickly raised during the immersion, thereby causing the liquid to flow up into the bore.

2. In a device for wetting the surface of a bore that is closed above and extends up into an article from below; the combination of a holder for the liquid having a spur projecting upwardly and adapted to pass into the said bore and displace a portion of the atmospheric air within the liquid; a depressible rest for the article, with means for normally holding the rest in an elevated position, all of said parts cooperating when the article is placed on the rest and depressed, to force the spur up into the bore, so that when the article is quickly raised during the immersion a partial vacuum will be developed in the bore that causes the liquid to flow up into the same.

3. A device of the kind described, constructed according to claim 2, provided with a plurality of bores with spurs corresponding to the same, and including means for facilitating the proper orientation of the article to insure alignment of the spurs with their corresponding bores.

4. A device of the kind described, constructed according to claim 2, in which a spring is provided for normally maintaining the rest in an elevated position, and guiding means is provided on the holder for guiding the article in an oriented position to align said bores with their corresponding spurs.

5. In a device for wetting the surface of a plurality of drilled holes extending up into an article from below; the combination of a cup for holding the liquid, said cup having a plurality of spurs projecting upwardly and adapted to pass into the said drilled holes and displace a portion of the atmospheric air within the same when the said article is immersed in the liquid, a coil spring disposed below the article and compressed by the article when it is pushed downwardly within the cup, said spurs operating to create a partial vacuum in the drilled holes when the said article is quickly raised during the immersion, thereby causing the liquid to flow up into the said holes.

6. In a device for wetting the surface of a plurality of drilled holes that are closed above and that extend up into an article from below; the combination of a holder having a cup form body with a bottom having an upwardly extending guide member, a rest for the article and guided on said guide member, said bottom having a plurality of upwardly projecting spurs aligning respectively with the said drilled holes when the article is placed on the rest for immersion in the liquid, a coil spring disposed around said guide member and thrusting against the under side of the rest, said spurs operating to create a partial vacuum in the drilled holes when the said article is immersed and quickly raised, thereby causing the liquid to flow up into the holes.

7. A device of the kind described, constructed in accordance with claim 6, in which the inner wall of the cup is provided with means for maintaining the article in a properly oriented position as it moves downwardly in the liquid to insure that the spurs align with their corresponding holes.

ERNEST D. PHILLIPS.